Patented Aug. 8, 1933

1,921,528

UNITED STATES PATENT OFFICE 1,921,528

ARC WELDING ROD

James M. Keir, Bayside, N. Y., assignor to Oxweld Acetylene Company, a Corporation of West Virginia No Drawing. Application September 30, 1929
Serial No. 396,414

4 Claims. (Cl. 219—8)

This invention relates to welding with the electric arc and especially to the use of alloy weld rods for the rapid production of welds in which the deposited metal of the welds may consist of carbon steel.

Heretofore, alloy welding rods containing silicon and manganese in variable proportions up to 1.5% of silicon and up to 1.75% of manganese have been used in gas-torch welding. When the metal of these rods is deposited with a torch, such as an oxy-acetylene torch, the rods are capable of producing clean unoxidized weld metal which consists of carbon steel, but where an arc is used at greater welding speeds, the rods do not give weld metal that is strong and free from the deleterious substances formed by the combination of the constituents of the rods with the atmosphere surrounding the arc. Rods having coatings or cores of slag-forming and protective elements have been used for arc welding. These coatings and cores give some degree of protection to the arc-deposited metal when they are proportioned so as to produce deposits of certain alloys but coated and cored rods have not produced clean carbon steel welds of the best quality.

I have made alloy weld rods containing regulated amounts of silicon and manganese that are capable of being used for welding with the electric arc and which are especially useful in connection with high currents, that is to say with arcs which utilize 200 to 650 or more amperes. My welding rod when used in an arc employing such high currents deposits substantially oxide free carbon steel of high strength and ductility. The alloy rod is rapidly reduced to a molten state by the large amount of intense heat rapidly produced in the high current arc and the weld metal is rapidly deposited as is required in high speed welding. The deposited metal unites with the base metal, or metal of the piece being welded, without puddling and solidifies substantially free from the deleterious compounds containing elements of the welding rod and elements of the atmosphere surrounding the arc. The inclusion of these deleterious atmospheric constituents is prevented by the presence of the reducing and slag forming agents homogeneously alloyed with the other constituents of the rod. Most of these agents consisting of silicon and manganese separate from the metal of the rod under the heat of the arc and collect in a layer of slag on the deposited metal. The layer of slag formed on the deposited metal is thick and has a high melting point which prevents the successful use of the rod in a gas-torch which has a lower temperature than the electric arc.

My rods may be used to some extent in low current arcs, that is an arc below 200 amperes, but the rate of deposition of the weld metal is much less than that in a high current arc, because the rate of the production of heat is much less in the former case, and the rate of heat generation is insufficient to cause the silicon and manganese to readily form slags. The action of the low current arcs is ordinarily sufficient to burn out the silicon and manganese if the arcs are played on the puddles of fused deposited metal a sufficient length of time. Without a considerable manipulation, the low current arc does not give the most uniform results or quickly produce weld metal of a certain or definite composition with the rapidity required for high speed welding. With the use of the rods of my invention, carbon arc welding with high current arcs gives the best results, but the rods may also be used as the electrodes in the metal electrode method of welding.

The arc welding rods of my invention consist mainly of iron and contain more than 1.50% of silicon and preferably more than 1.75% of manganese. The manganese and silicon which are homogeneously alloyed with the iron may each be present up to about 6.0%. The rods may contain carbon from traces up to about 0.60% and they may also contain small amounts of unessential elements such as sulphur, phosphorus and the like.

An alloy rod which has given exceptionally good results with the above mentioned high current arcs, contained 0.15% carbon, 2.2% silicon and 2.4% manganese. The rod was used with a carbon arc carrying 450 amperes. During welding, the metal of the rod lost about half of its carbon and practically all of its silicon and manganese. A comparatively large amount of slag was formed from the oxidation of the iron, silicon and manganese, and these oxides were practically all contained in the slag which collected on the surface of the deposited metal. The deposited metal had a tensile strength of 60,000 pounds per square inch and an elongation in two inches of 7.0%. A weld made under similar conditions with a rod containing the same amount of carbon and with less than 1.50% silicon and less than 1.75% of manganese contained practically no carbon, silicon or manganese and the deposited metal was highly oxidized. The tensile strength of the latter metal was 45,000 pounds per square inch and the elongation in two inches was 3.0%.

Alloy rods containing more than 1.50% and not over 4.0% silicon without manganese produce clean strong weld metal when they are used for welding with the arc. With more than about 4.0% silicon, the slag does not have a satisfactory fluxing action when manganese is not present. With less than about 4.0% silicon, I prefer to have manganese present, but the beneficial effect of manganese is not usually obtained with less than 1.75% manganese.

I claim:

1. An arc welding rod composed of an alloy which comprises iron as the main constituent, the remainder being substantially carbon a trace to .60%, manganese a trace to 6.0% and about 1.5% to 4.0% silicon.

2. An arc welding rod composed of an alloy which comprises iron as the main constituent, the remainder being substantially carbon, a trace to .60%, more than 1.5% and not more than 6.0% silicon and not less than 1.75% and not more than 6.0% manganese.

3. An arc welding rod composed of an alloy which comprises iron as the main constituent, the remainder being substantially carbon, from a trace to about 0.60%, more than 1.5% and not more than 6.0% silicon, and more than 1.75% and not more than 6.0% manganese.

4. An arc welding rod composed of an alloy which is composed substantially of iron as the main constituent, about 0.15% carbon, about 2.2% silicon and about 2.4% manganese.

JAMES M. KEIR.